United States Patent

Hara

[11] Patent Number: 5,260,619
[45] Date of Patent: Nov. 9, 1993

[54] FREQUENCY GENERATOR

[75] Inventor: Masayoshi Hara, Nagano, Japan

[73] Assignee: Kabushiki Kaisha Sankyo Seiki Seisakusho, Nagano, Japan

[21] Appl. No.: 651,169

[22] Filed: Feb. 6, 1991

[30] Foreign Application Priority Data

Feb. 7, 1990 [JP] Japan .................. 2-11337[U]

[51] Int. Cl.5 .................................. H02K 47/00
[52] U.S. Cl. ........................... 310/160; 310/45;
310/156; 310/207; 310/DIG. 6
[58] Field of Search .............. 310/156, 171, 203, 207,
310/208, DIG. 6, 72, 68 R, 45, 71, 268, 160,
161; 318/138, 254

[56] References Cited

U.S. PATENT DOCUMENTS

| 4,109,170 | 8/1978 | Fujita | 310/68 R |
|---|---|---|---|
| 4,410,853 | 10/1983 | Ikoma | |
| 4,525,657 | 6/1985 | Nakase | 318/254 |
| 4,620,139 | 10/1986 | Egami | 310/68 R |
| 4,633,110 | 12/1986 | Genco | 310/68 R |
| 4,701,650 | 10/1987 | Maemine | 310/68 R |
| 4,803,425 | 2/1989 | Swanberg | |
| 4,902,923 | 2/1990 | Okauchi | 310/DIG. 6 |
| 4,975,607 | 12/1990 | Hara | 310/68 R |
| 5,006,765 | 4/1991 | Schmider | 310/208 |
| 5,126,613 | 6/1990 | Choi | 310/71 |

FOREIGN PATENT DOCUMENTS 0351175 1/1990 European Pat. Off. .

Primary Examiner—R. Skudy
Attorney, Agent, or Firm—Sughrue, Mion, Zinn, Macpeak & Seas

[57] ABSTRACT

In a frequency generator, some of connecting wire elements forming the generator coil pattern are omitted. The circuit wiring pattern is partially laid in a printed wiring board surface area located between the adjacent generator wire elements, which is not connected because the connecting wire elements are omitted. The adjacent generator wire elements not connected are connected by a conductor, which is electrically insulated from the circuit wiring pattern.

10 Claims, 3 Drawing Sheets

FREQUENCY GENERATOR

BACKGROUND OF THE INVENTION

1. Field of the Invention

The present invention relates to a frequency generator in which a circuit wiring pattern and a generator coil pattern including generator wire elements connected by connecting wire elements, are formed on a printed wiring board.

2. Description of the Prior Art

Generally, frequency generators (FG) attached to various types of motors include both a frequency-generator magnetized section having magnetized portions circumferentially arranged, and a generator coil pattern disposed facing the FG magnetized section. The generator coil pattern, which is shaped like a ring, is formed on a printed wiring board (PWB). The coil pattern consists of a plurality of generator wire elements radially oriented, and connecting wire elements for connecting the generator wire elements into a series-connected wire. A predetermined circuit wiring pattern is also formed on the PWB.

The arrangement of the generator coil pattern and the circuit wiring pattern on the same PWB has been provided in various ways in conventional frequency generators, which are described below in brief.

In the conventional frequency generators shown in FIGS. 6(a) and 6(b), a generator coil pattern 2 and a circuit wiring pattern 3 are formed on opposite sides of a printed wiring board (PWB) 1, respectively. More specifically, the generator coil pattern 2 is formed on the obverse side of PWB 1 (FIG. 6(a)), and the wiring pattern 3 is formed on the reverse side (FIG. 6(b)). The patterns on both sides of PWB 1 are interconnected by way of through-holes (not shown).

In another frequency generator shown in FIG. 7, a generator coil pattern 2 and a circuit wiring pattern 3 are printed on the same side of a PWB 1. The circuit wiring pattern 3 is first printed on PWB 1; an undercoat is then applied over necessary portions of the resultant structure; and a generator coil pattern 2 is subsequently printed on the structure. Finally, an overcoat is applied over the previously applied generator coil pattern 2.

In an additional frequency generator shown in FIG. 8, a generator coil pattern 2 and a circuit wiring pattern 3 are also printed on one side of a PWB 1. In this construction, however, a part of the generator coil pattern 2 is omitted. That is, the generator coil pattern 2 is shaped like an arc, i.e., takes the form of an imperfect or discontinuous ring. The circuit wiring pattern 3 is partially laid in the omitted part of the coil pattern 2 on PWB 1 surface.

Those conventional frequency generators, whose circuit wiring pattern and generator coil pattern are formed as described above, have the disadvantages described below.

In the frequency generator whose coil pattern 2 and circuit wiring pattern 3 are formed respectively on the obverse and reverse sides of PWB 1 as shown in FIG. 6(a), through-holes 4 must be formed in PWB 1. Accordingly, a magnetic printed wiring board, such as an iron plate, cannot be used, and an additional piece, such as a back-yoke, for forming magnetic paths must be provided. Further, since the patterns must be formed in connection with the through-holes 4, chip parts cannot be used and therefore discrete parts must be used in place of the former. Accordingly, the parts used are expensive, and it is difficult to automate the mounting operation for these parts. The manufacturing cost of the frequency generator is therefore high.

In the frequency generator of FIG. 7 in which the coil pattern 2 and the wiring pattern 3 are printed on one side of PWB 1, the number of manufacturing steps is increased because of the additional steps needed to form the undercoat and the overcoat. This results in low production efficiency and high manufacturing costs. Additionally, during the printing of the patterns on the printed wiring board, resin phenol powder is produced when PWB 1 is cut, and this powder frequently disrupts the generator coil pattern 2.

The frequency generator of FIG. 8 in which some part of the generator coil pattern 2 is not printed, succeeds in solving the problems of low production efficiency and increased manufacturing cost, but creates other problems. Since some part of the coil pattern 2 is not printed, the output of the frequency generator, which is the sum of the outputs of the generator wire elements of the coil pattern 2, becomes correspondingly small. The wow and flutter of the FG output is also large.

SUMMARY OF THE INVENTION

For the above background reasons, the present invention has an object to provide a frequency generator which effectively forms the generator coil pattern and the circuit wiring pattern on one side of a printed wiring board, and produces a frequency-generator output having a satisfactory level.

To achieve the above object, there is provided a frequency generator having a frequency-generator magnetized section having magnetized portions circumferentially arranged, a ring-like generator coil pattern being formed on a printed wiring board and disposed facing the frequency-generator magnetized section, and a circuit wiring pattern formed on the printed wiring board, the generator coil pattern including a plurality of generator wire elements radially arranged and a plurality of connecting wire elements for connecting the generator wire elements into a series-connected wire, improved wherein some of connecting wire elements forming the generator coil pattern are omitted, the circuit wiring pattern is partially laid in a printed wiring board surface area located between the adjacent generator wire elements, which are not connected because the corresponding connecting wire elements are omitted, and the adjacent generator wire elements not connected are connected by a conductor, which is electrically insulated from the circuit wiring pattern.

In the frequency generator thus constructed, the generator coil pattern finally formed takes a shape of a continuous ring which does not include an unconnected portion. Therefore, the frequency generator of the invention is free from the problems of reduced frequency-generator output owing to the discontinuous-ring-shape of the generator coil pattern and increased wow and flutter. In the frequency generator of the present invention, the generator coil pattern and the circuit wiring pattern are formed on one side of the printed wiring board but the manufacturing steps for forming the undercoat and overcoat are not used. Therefore, those patterns can be formed on the printed wiring board surface effectively.

BRIEF DESCRIPTION OF THE DRAWINGS

Other objects, features, and advantages of the invention will be apparent from the following description in connection with the accompanying drawings, in which.

DETAILED DESCRIPTION OF THE PREFERRED EMBODIMENTS

Preferred embodiments of a frequency generator according to the invention will be described with reference to the accompanying drawings.

Figure 1:
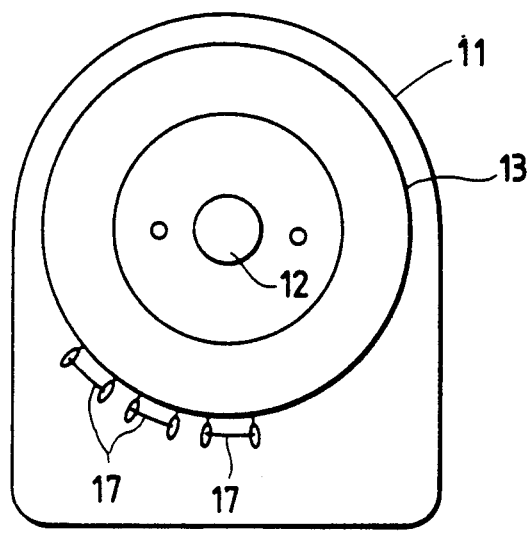
FIG. 1 is a plan view showing a frequency generator according to an embodiment of the invention.
Figure 2:
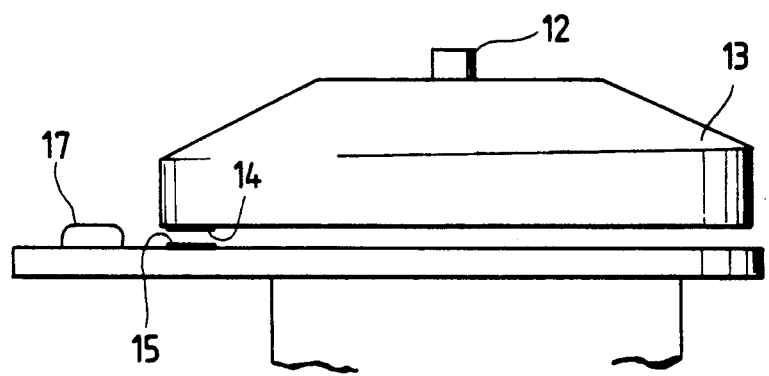
FIG. 2 is a side view showing the frequency generator of FIG. 1.

Reference is first made to FIGS. 1 and 2 showing a plan view and a side view of a frequency generator (FG) according to an embodiment of the invention. As shown, a rotor 13, mounted on a shaft 12, is disposed above a printed wiring board (PWB) 11 and faces the latter. Magnets 14, acting as frequency generator magnetized portions, are mounted on the surface of the rotor 13 which faces PWB 11. A generator coil pattern 15 is formed on the surface of PWB 11, which faces the rotor 13.

Figure 3:
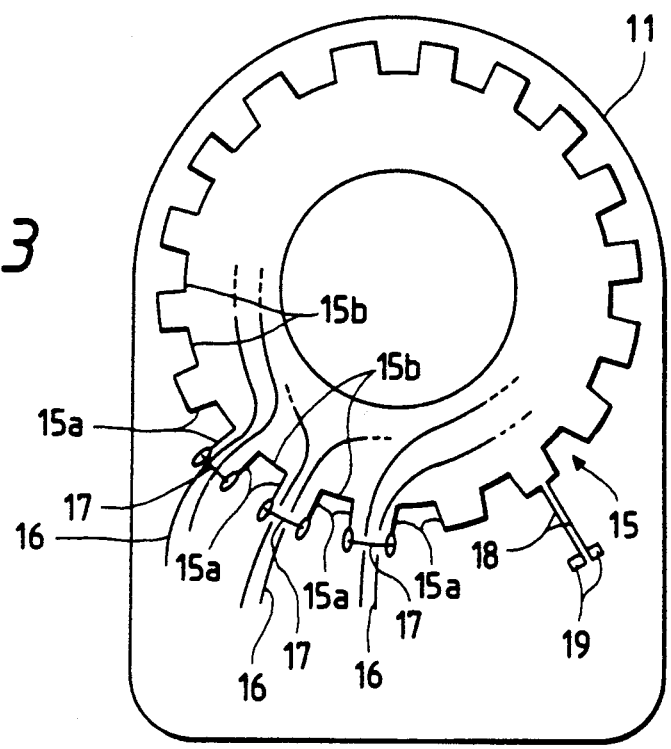
FIG. 3 is a plan view showing the mounting of a printed wiring board in the frequency generator.
Figure 4:
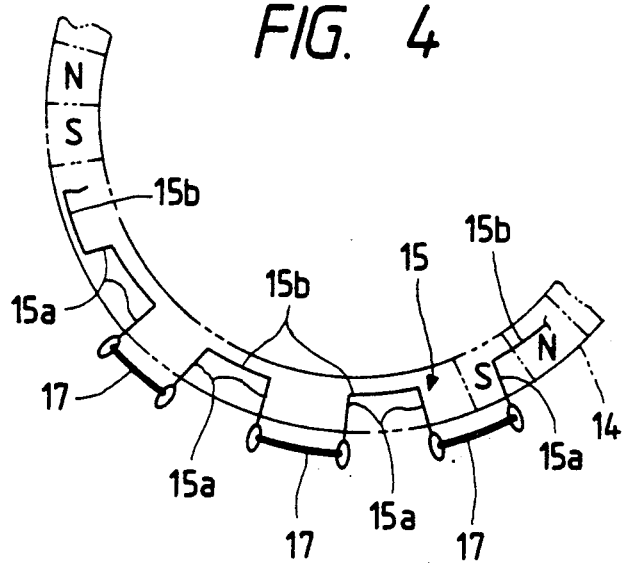
FIG. 4 is an enlarged view showing a part of the printed wiring board in the frequency generator.

As shown in FIGS. 3 and 4, the magnets 14 consist of S-poles and N-poles alternately arranged in the circumferential direction. The generator coil pattern 15, which is shaped like a ring and faces magnets 14, is disposed coaxially with the magnets 14. The generator coil pattern 15 consists of a plurality of generator wire elements 15a electrically connected by a plurality of connecting wire elements 15b. The generator wire elements 15a are circumferentially disposed and radially oriented on PWB 11. The ends of the adjacent generator wire elements 15a thus arranged are connected by means of the connecting wire elements 15b to form U-shaped portions. Those generator wire elements 15a, when connected, forms a series-connected wire. One of the connecting wire elements 15b is cut so as to form two leading wires 18. Output terminals 19 are connected on the leading wires 18, respectively. Therefore, the output signal of the frequency generator advantageously is supplied to the output terminals 19. The distance between the leading wires is approximately 0.5 mm.

An appropriate number of those connecting wire elements 15b are omitted (in the embodiment illustrated in FIG. 3, three connecting wire elements are omitted). A circuit wiring pattern 16, formed or printed on PWB 11, is partially laid in the areas on the printed wiring board surface, each of which exists between the adjacent generator wire elements 15a, which are not connected together because the connecting wire elements 15b are omitted. Jumper wires 17 for connecting the omitted portion of connecting wire elements 15b, described above, are disposed above an insulated protection layer formed above the wiring pattern 16, thus being electrically insulated from the wiring pattern. The jumper wires 17, acting as lead wires, are soldered at the lead ends to corresponding outer ends of the radially oriented generator wire elements 15a, respectively.

It is noted that the soldered portions of the generator wire elements 15a are radially and outwardly extended to such an extent that the connection of the generator wire elements 15a by the jumper wires 17 is performed outside the rotor-facing area. Of course, in order to be insulated from the wiring pattern 16, it is preferable to form the jumper wire 17 disposed above the wiring pattern 16.

In the instant embodiment, the generator wire elements 15a of the generator coil pattern 15 are shaped, except for the leading portion of the leading wire 18, in a continuous ring, which has few unconnected portions. Because of the continuous-ring shape of the coil pattern 15, the frequency generator of the embodiment is free from the problems of reduced FG output owing to the discontinuous-ring-shape of the generator coil pattern and increased wow and flutter. It is further noted that a master pattern, including the generator coil pattern 15 and the circuit wiring pattern 16, advantageously can be formed on one side of PWB 11 in a single etching step without using the steps for forming the undercoat and the overcoat. Therefore, those patterns can be formed on the printed wiring board efficiently.

As discussed above, the soldered portions of the lead wires to the generator wire elements 15a are located outside the area facing the rotor 13. In other words, the soldered portions are located out of the magnetic paths of the magnets 14. The radial extension of the generator wire elements 15a does not create any problem. On the contrary, if the jumper wires 17 are located within the rotor facing area, the generator wire elements 15a are extended into the magnetic paths of the magnets 14. The amount of the electric power generated by the extended generator wire elements 15a becomes different from that generated by the non-extended wire elements 15a. The generated electric power difference makes the FG output nonuniform and degrades the signal-to-noise (S/N) ratio. Also, where the lead wires 17 are provided within the rotor-facing area, the spatial freedom is reduced because the gap between the rotor 13 and PWB 11 is initially very small. The reduced spatial freedom would produce other disadvantages in the manufacture of the frequency generator.

The construction of the frequency generator of the instant embodiment allows an iron plate to be used for PWB 11. If it is used for PWB 11, the magnetic paths may be formed in the iron plate. In this case, there would be no need of the additional back-yoke for forming the magnetic paths, and an economical frequency generator can be provided.

Figure 5:
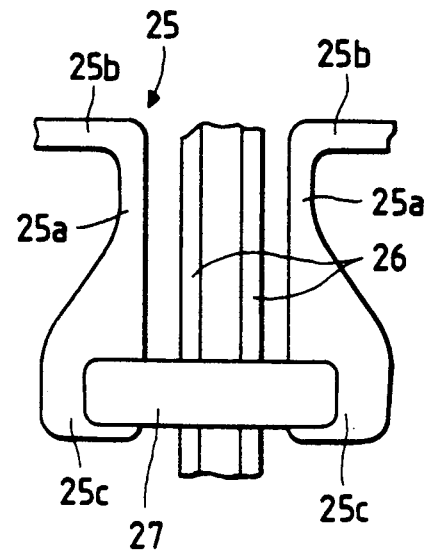
FIG. 5 is a partial plan view showing a generator coil pattern and a circuit wiring pattern formed on a printed wiring board in a frequency generator according to another embodiment of the invention.
Figure 6A:
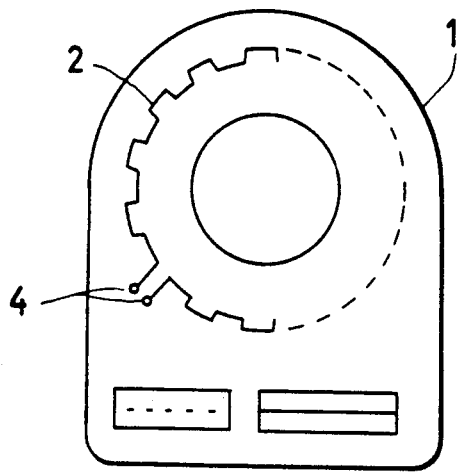
FIGS. 6(a) and 6(b) are plan views showing a conventional frequency generator of the type in which a generator coil pattern and a circuit wiring pattern are respectively printed on the obverse and reverse sides of a printed wiring board.
Figure 6B:
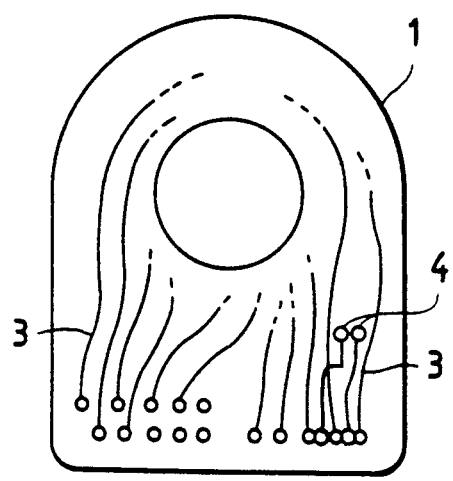
Figure 7:
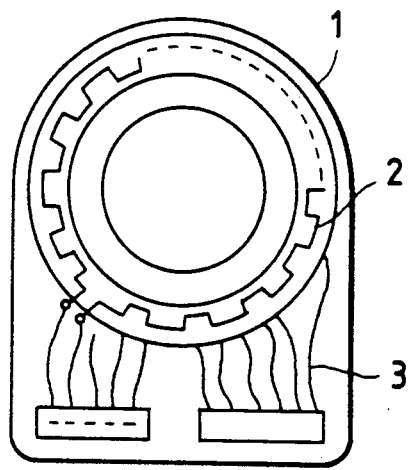
FIGS. 7 and 8 are plan views showing another type of the conventional frequency generator in which both the patterns are formed on one side of the printed wiring board.
Figure 8:
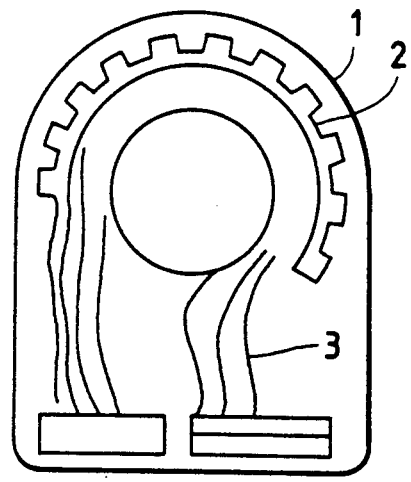

A second embodiment of the frequency generator according to the present invention is illustrated in FIG. 5. In the frequency generator, each of generator wire elements 25a forming a generator coil pattern 25 contains a wide land portion 25c located closer to the outer end of the generator wire element 25a as viewed in the radial direction. The land portions of the adjacent generator wire elements are connected by a chip jumper 27.

In the embodiment, a resistor whose resistance is zero ohms, i.e., a standard type jumper (cross conductor), is used for the chip jumper 27. A wiring pattern 26 is partially disposed and formed in an area just under the chip jumper 27 where a connecting wire element 25b is not formed or is omitted. Of course, it is preferable to form a protecting layer between the chip jumper 27 and the wiring pattern 26. The second embodiment can provide substantially the same operation and effect as those provided by the first embodiment.

Also in the second embodiment, the land portion 25c to which the chip jumper 27 is soldered is extended to be outside the area facing the rotor. (See numeral 13 in FIGS. 1 and 2.) That is, it is located out of the magnetic paths. Therefore, the second embodiment successfully solves the problems owing to the extension of the generator wire elements 25a, that is, degradation of the S/N ratio caused by a nonuniform FG output.

As seen from the foregoing description, some of connecting wire elements forming the generator coil pattern are omitted. The circuit wiring pattern is partially laid in an area on the printed wiring board, which exists between the adjacent generator wire elements, which are not connected together because the connecting wire elements are omitted. The circuit wiring pattern and the generator wiring pattern, electrically insulated from one another, are both formed in a plane. The adjacent generator wire elements not connected by connecting wire elements are connected by a conductor, which is electrically insulated from the circuit wiring pattern. Accordingly, the generator coil pattern is shaped to form a continuous ring which does not have an unconnected portion. Thus, the present invention successfully solves the problems of reduced FG output caused by a discontinuous generator coil pattern and increased wow and flutter in the FG output. The FG output of the frequency generator is satisfactorily level. Further, the generator coil pattern and the circuit wiring pattern can be formed on the single side of the printed wiring board.

While there has been described what is at present considered to be the preferred embodiments of the invention, it will be understood that various modifications may be made therein, and it is intended to cover in the appended claims all such modifications that fall within the true spirit and scope of the invention.

What is claimed is:

1. A frequency generator, comprising:
   a rotor operatively connected to a shaft and having a plurality of magnets disposed circumferentially in a rotor surface of said rotor disposed substantially perpendicular to an axial direction of said shaft;
   a printed wiring board having a surface opposing said magnets and separated by a gap, said printed wiring board including:
   a generator coil pattern having a shape of a ring and disposed coaxially with said magnets and including a plurality of generator wire elements;
   a plurality of connecting wiring elements for electrically coupling selected ones of said generator wire elements so as to produce a serial circuit and at least one pair of adjacent generator wire elements which are not coupled by a corresponding one of said connecting wiring elements;
   a circuit wiring pattern, a portion of which is disposed between said at least one pair of adjacent generator wire elements; and
   at least one connector for connecting said at least one pair of adjacent generator wire elements, said at least one connector being electrically insulated from said portion of said circuit wiring pattern.

2. The frequency generator according to claim 1, wherein the portions of said pair of adjacent generator wire elements to which said at least one connector is connected are located outside of said gap.

3. The frequency generator according to claim 1, wherein portions of said pair of adjacent generator wire elements to which said at least one connector is connected are radially and outwardly extended to such an extent as to permit connection of said at least one connector to said pair of adjacent generator wire elements outside of an area of said printed wiring board facing said rotor.

4. The frequency generator according to claim 1, wherein said at least one connector is a jumper wire.

5. The frequency generator according to claim 4, wherein said jumper wire is disposed above said wiring pattern.

6. The frequency generator according to claim 1, wherein said printed wiring board further comprises a plurality of land portions, each of said land portions being serially coupled between one of said adjacent pair of generator wire elements and said at least one connector and wherein said at least one connector further comprises a chip jumper.

7. The frequency generator according to claim 5, wherein said chip jumper is a zero ohm resistor.

8. The frequency generator according to claim 1, wherein said printed wiring board is an iron plate.

9. A frequency generator, comprising:
   a rotor operatively connected to a shaft and having a plurality of magnets disposed circumferentially in a rotor surface of said rotor disposed substantially perpendicular to an axial direction of said shaft;
   a printed wiring board having a surface opposing said magnets and separated by a gap, said printed wiring board including:
   a generator coil pattern having a shape of a ring and disposed coaxially with said magnets and including a plurality of generator wire elements;
   a plurality of connecting wiring elements for operatively coupling selected ones of said generator wire elements so as to produce a serial circuit and at least one pair of adjacent generator wire elements;
   a circuit wiring pattern, a portion of which is disposed between said at least one pair of adjacent generator wire elements; and
   at least one connector for electrically coupling said at least one pair of adjacent generator wire elements, said at least one connector being electrically insulated from said circuit wiring pattern;
   and wherein said wiring board further comprises a plurality of land portions, each of said land portions being serially coupled between one of said adjacent pair of generator wire elements and said at least one connector, and wherein said at least one connector further comprises a chip jumper.

10. A frequency generator, comprising:
    a rotor operatively connected to a shaft and having a plurality of magnets disposed circumferentially in a rotor surface of said rotor disposed substantially perpendicular to an axial direction of said shaft;
    a printed wiring board having a surface opposing said magnets and separated by a gap, said printed wiring board including:

a generator coil pattern having a shape of a ring and disposed coaxially with said magnets and including a plurality of generator wire elements;

a plurality of connecting wiring elements for operatively coupling selected ones of said generator wire elements so as to produce a serial circuit and at least one pair of adjacent generator wire elements which are not coupled by a corresponding one of said connecting wiring elements;

a circuit wiring pattern, a portion of which is disposed between said at least one pair of adjacent generator wire elements; and at least one connector for electrically coupling said at least one pair of adjacent generator wire elements, said at least one connector being electrically insulated from said circuit wiring pattern;

wherein said at least one connector is a jumper wire disposed above said wiring pattern, and said jumper wire is a zero ohm resistor.

* * * * *